(12) United States Patent
Heitmann

(10) Patent No.: US 6,786,991 B1
(45) Date of Patent: Sep. 7, 2004

(54) METHOD FOR MANUFACTURING PREFORMS FOR POLYMER OPTICAL FIBERS

(75) Inventor: Walter Heitmann, Gross-Bieberau (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/937,927
(22) PCT Filed: Mar. 25, 2000
(86) PCT No.: PCT/EP00/02653
§ 371 (c)(1), (2), (4) Date: Dec. 4, 2001
(87) PCT Pub. No.: WO00/59712
PCT Pub. Date: Oct. 12, 2000

(30) Foreign Application Priority Data

Apr. 1, 1999 (DE) .......................... 199 14 958

(51) Int. Cl.$^7$ .............................. B65H 81/00
(52) U.S. Cl. ..................... 156/187; 156/188; 156/191; 156/275.5; 156/172; 264/1.24
(58) Field of Search ................ 156/187, 188, 156/191, 275.5, 172; 264/1.24; 385/124, 126, 128

(56) References Cited

U.S. PATENT DOCUMENTS

| 4,139,262 | A | * | 2/1979 | Mahlein et al. | ............. 385/127 |
| H000219 | H | * | 2/1987 | Sayles | ......................... 156/169 |
| 5,235,660 | A | * | 8/1993 | Perry et al. | .................. 385/124 |
| 6,086,999 | A | * | 7/2000 | Ilvashenko | ................... 385/124 |
| 6,185,353 | B1 | * | 2/2001 | Yamashita et al. | .......... 385/124 |

FOREIGN PATENT DOCUMENTS

| DE | 37 30 198 | 3/1989 |
| DE | 38 14 295 A1 | 11/1989 |
| EP | 0 662 620 A1 | 7/1995 |
| EP | 0 708 346 A1 | 4/1996 |
| EP | 0 866 348 A2 | 9/1998 |
| JP | 5515684 B | * 4/1980 | ........... G02B/5/172 |
| WO | WO 98/10916 | 3/1998 |

* cited by examiner

Primary Examiner—Jeff H. Aftergut
Assistant Examiner—Todd J. Kilkenny
(74) Attorney, Agent, or Firm—Kenyon & Kenyon

(57) ABSTRACT

A method for manufacturing preforms for polymer optical fibers having an index of refraction that is variable over the radius, in which a core of preform material is coated with coating material for forming the preform until a predefinable diameter is reached, the refractive index of the coating material being varied in conformance with a predefinable profile along the radius of the emerging preform.

22 Claims, 2 Drawing Sheets

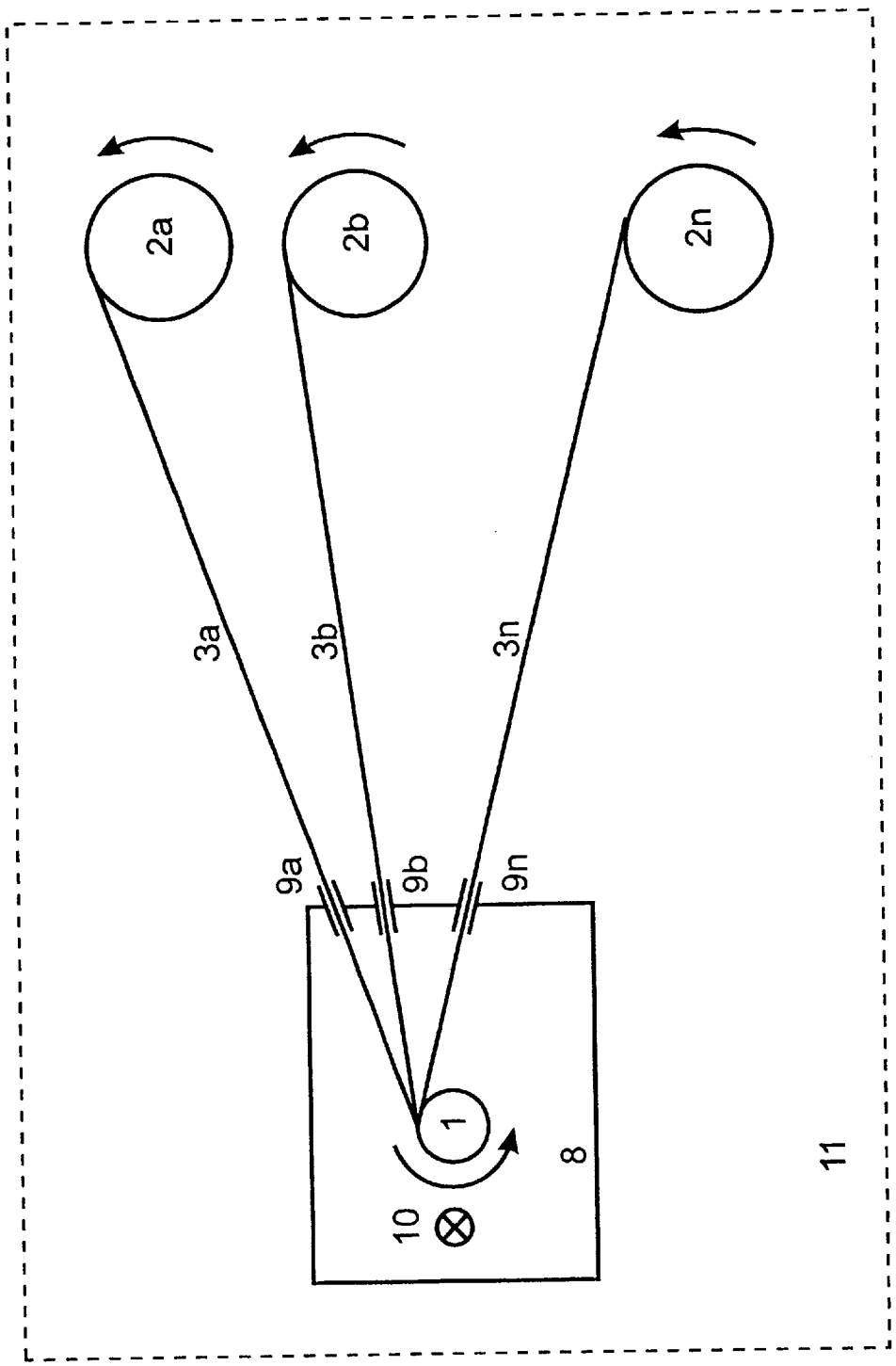

METHOD FOR MANUFACTURING PREFORMS FOR POLYMER OPTICAL FIBERS

FIELD OF THE INVENTION

The present invention is directed to a method for manufacturing preforms for polymer optical fibers having a variable refractive index over the radius.

BACKGROUND INFORMATION

Polymer optical fibers (POF or plastic fibers) are optical waveguides which are apparently being used to an increasing degree to transmit information and data.

When setting up broadband communications networks, the terminal branches between the principal conductors of the network and the end customers may account by far for the greatest share of required data lines. Therefore, it may be economically significant to reduce the costs of the networks' terminal branches.

It is believed that, under the state of the art, metal or fiber optic cables are still predominantly employed for the terminal branches of modern fiber optic networks.

Since, for the most part, terminal branches turn out to be quite short in length, it suffices, however, to use plastic fibers which do, in fact, exhibit a higher attenuation than optical glass fibers, but are much simpler to process (or machine). Moreover, the requisite plastics may be manufactured in virtually any desired quantity at low costs, which may also constitute an advantage over metal cables. In addition, they are insensitive to induced interference voltage and possess a high transmission (or communication) capacity.

At the present time, virtually only so-called step-index POFs are available. These are optical waveguides having a core of a plastic of a higher refractive index and a plastic cladding of a lower refractive index. This type of fiber has a typical transmission bandwidth of 100 Mb/s over 100 m length. This value does not suffice for broadband networks. They require transmission rates in the Gb/s range.

Such high transmission bandwidths may be achieved using graded index POF (GI-POF). These are fibers whose refractive index in the core may decrease steadily from the axis toward the edge more or less in a parabolic curve shape. However, it is believed that there is no prior economical manufacturing process for GI-POF based on any methods that may be available. In this context, a main problem is being able to produce large enough preforms for the fiber manufacturing.

SUMMARY OF THE INVENTION

An exemplary method and/or exemplary embodiment of the present invention is directed to providing a method for economically producing preforms having adjustable refractive index profiles.

Another exemplary method and/or exemplary embodiment of the present invention is directed to providing that a core of preform material for forming the preform is coated with coating material until a predefinable diameter is reached, the refractive index of the coating material to be applied being successively varied in conformance with a predefinable profile along the radius of the emerging preform. Provision may also be made in the manufacturing of GI-POFs for the refractive index of the coating material to be reduced along the radius of the preform. Through this method, the refractive index of the material may be adjusted virtually infinitely, continuously and/or steplessly over the radius of the preform, in that prior to or during the coating operation. Measures may be taken to selectively vary the refractive index of the coating material to be applied.

Another exemplary method and/or exemplary embodiment of the present invention is directed to providing for the coating material to be sputtered (or injection molded) or extrusion-coated on, material having different refractive indices being added to varying degrees to the coating material to vary the refractive index, or dopants being added to varying degrees to the coating material to vary the refractive index.

Another exemplary method and/or exemplary embodiment of the present invention is directed to providing for at least one film of the coating material to be coiled around the core, while continuously fusing with the core material, until a predefinable diameter is reached, the refractive index of the film being varied with the length; provision may be made for the film to be fused on using a device which is situated alongside the core and which emits a radiation such that the radiation may be absorbed by the coiled-on film under heating, thereby leading to softening and fusing of the film.

It is believed that by alternating films having different indices of refraction, by pretreating the films to be coiled on, for example, by irradiating them or by adding dopants thereto, the refractive indices during the coiling can be precisely adjusted. In this manner, preforms having virtually any desired thickness and whose refractive index profile is precisely adjusted, may be manufactured economically. The slightly graded (or stepped) nature of the preform's refractive index profile may be smoothed by scaling effects and by the diffusion (or inward diffusion) of dopants when the fiber is fabricated from the preform, so that the fiber exhibits a virtually constant refractive index profile over the radius.

BRIEF DESCRIPTION OF THE DRAWINGS

FIG. 2 shows another device for implementing another exemplary method of the present invention.

DETAILED DESCRIPTION

Figure 1:
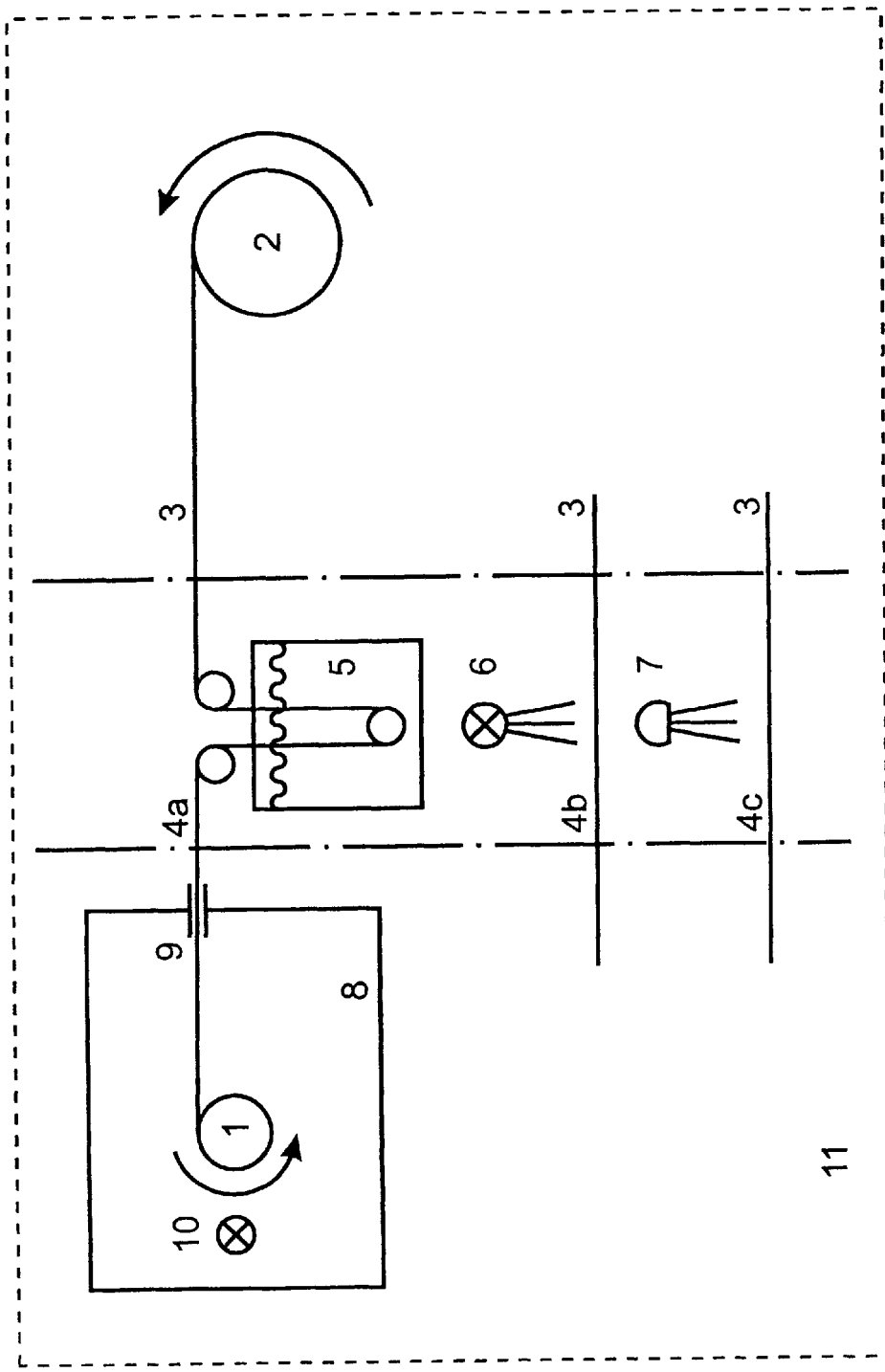
FIG. 1 shows a device for implementing an exemplary method of the present invention.

As the core of the preform, one uses a cylindrical rod 1 having a typical diameter of 1 mm to 10 mm and a length of, for example, 1 m, of a plastic having the requisite refractive index, such as acrylic glass. Onto this rod is wound a plastic film 3 having a thickness of about 1 $\mu$m to 1000 $\mu$m and situated on a drum 2. FIG. 1 shows a schematic illustration. In this context, rod 1 to be wound upon is disposed horizontally. To avoid deformations during the winding, rod 1 may also either be disposed perpendicularly or be placed under tensile stress.

The refractive index of film 3 which is present at the outset and which may be identical to that of the rod material, may be reduced using various method steps, either individually or in combination, and, in fact, by running film 3 through one or more diffusion baths 5 (altered film 4a), through UV, IR, gamma, ion, or electron irradiation 6 of film 3 (altered film 4b); or by spraying 7 it with dopants or plastics, which, by themselves or with subsequent irradiation, reduce the refractive index of film 3 (altered film 4c).

The treated film is wound onto rotating core 1 under continuous fusing. In the process, small steps in the refractive index may, in fact, result from layer to layer through the thickness of the film, in other words, virtually a stepped profile may be obtained. However, the steps may be so fine that the fiber that is subsequently drawn from the preform exhibits a quasi-continuous refractive index profile, where the height of the steps is reduced by the quotient of the preform diameter and the fiber diameter. The profile may be further smoothed out by annealing the preform, the steps being compensated or offset by diffusion effects.

The manufacturing of POF requires extremely pure preform material. For that reason, the manufacturing of the preform should take place under clean room conditions. In addition, the preform must be free of gaseous inclusions in order to avoid bubbling. This is achieved in the example by evacuating coiling region 8, by conveying film 3 from out of ambient environment 11, existing under normal conditions, via an air lock 9, or by placing coiling region 8 under a helium atmosphere, because helium that is trapped during the winding process quickly diffuses out of the material.

To fuse film 3 to core 1, a radiation source is placed in parallel to core 1. Its spectral energy distribution is selected such that the radiation is absorbed within a thin layer—for example, of the film thickness—and softens or plasticizes the plastic, so that the boundary layers fuse together.

Further, two or more plastic films 3a through 3n, which are uncoiled from drums 2a–2n, may be simultaneously wound onto the central rod, as shown in FIG. 2, the refractive index of at least one of these films 3a through 3n being modified in accordance with the same methods as those described with reference to individual film 3. However, films 3a through 3n having different refractive indices may also be used, the thickness of individual films continually decreasing or increasing, so that a refractive index gradient of the film stack is thereby achieved. In the example, each film 3a–3n is conveyed via a separate lock 9a–9n (or air or vacuum lock) to coiling region 8.

What is claimed is:

1. A method for manufacturing a preform material for polymer optical fibers having a refractive index variable over a radius, comprising:
   coating with a coating material a core of the preform material for forming the preform material until a predefinable diameter is reached; and
   successively varying a refractive index of the coating material in conformance with a predefinable profile along the radius of an emerging preform;
   wherein the coating step includes coiling at least one film of the coating material on the core of the preform material, while continuously fusing with the core of the preform material until the predefinable diameter is reached, the refractive index of the at least one film being varied with a length.

2. The method of claim 1, wherein the at least one film is fused on using a radiation device situated alongside the core of the preform material, the radiation device being operable to emit a radiation that is absorbed by the at least one film under heating to soften and fuse the at least one film.

3. The method of claim 1, further comprising alternating between the at least one film and at least one other film of the coating material to alter the refractive index, the at least one film and the at least one other film having different indices of refraction.

4. The method of claim 1, wherein the at least one film includes a plurality of films, further comprising winding the plurality of films one over the other, each film of the plurality of films having different refractive indices, a refractive index of at least one of the plurality of films being variable over its length, to attain the variable refractive index of the preform material.

5. The method of claim 1, wherein the at least one film includes a plurality of films having different refractive indices and being coiled one over the other, the thickness ratio among the plurality of films over their length being variable to attain a variable total refractive index of the plurality of films.

6. The method of claim 5, further comprising drawing out at least one of the plurality of films to vary its thickness by varying its supply speed before coiling the at least one of the plurality of films.

7. The method of claim 1, further comprising altering the refractive index of the at least one film by irradiating the at least one film with electromagnetic radiation while coiling the at least one film.

8. The method of claim 1, further comprising altering the refractive index of the at least one film by irradiating the at least one film with particles while coiling the at least one film.

9. The method of claim 1, further comprising altering the refractive index of the at least one film by adding dopants to the at least one film while coiling the at least one film.

10. The method of claim 1, further comprising altering the refractive index of the at least one film by coating the at least one film with a material having a different refractive index.

11. The method of claim 9, wherein the dopants that alter the refractive index of the at least one film are sprayed on.

12. The method of claim 1, further comprising altering the refractive index of the at least one film by dipping the at least one film into a bath to alter the refractive index of the at least one film before coiling the at least one film.

13. The method of claim 12, further comprising dipping the at least one film into a bath fluid that effects a diffusion of any refractive index-altering substance between the at least one film and the bath fluid.

14. The method of claim 1, wherein the coiling of the at least one film occurs in a vacuum.

15. The method of claim 1, wherein the coiling of the at least one film occurs in a helium atmosphere.

16. The method of claim 1, wherein the core has a thickness on the order of 10 mm.

17. The method of claim 1, wherein a magnitude of a thickness of the at least one film to be coiled is within a range of from 1 $\mu$m to 1000 $\mu$m.

18. The method of claim 1, further comprising mechanically tensioning the core to avoid excessive deformation during coating.

19. The method of claim 1, further comprising holding the core vertically to avoid deformation during coating.

20. The method of claim 1, wherein the core and the coating material include acrylic glass.

21. The method of claim 1, wherein the core and the coating material include a PTFE-like plastic.

22. The method of claim 1, further comprising smoothing a profile of the refractive index of the preform material by annealing.

* * * * *